F. E. H. FROST.
COOKING UTENSIL.
APPLICATION FILED OCT. 31, 1914.

1,174,559.

Patented Mar. 7, 1916.

Witnesses
Robert M. Sutphen
A. J. Hind

Inventor
F. E. H. FROST
By Watson E. Coleman
Attorney

THE COLUMBIA PLANOGRAPH CO., WASHINGTON, D. C.

UNITED STATES PATENT OFFICE.

FRANK EDMUND HILL FROST, OF OAKLAND, CALIFORNIA.

COOKING UTENSIL.

1,174,559.  Specification of Letters Patent.  Patented Mar. 7, 1916.

Application filed October 31, 1914.  Serial No. 869,640.

*To all whom it may concern:*

Be it known that I, FRANK EDMUND HILL FROST, a citizen of the United States, residing at Oakland, in the county of Alameda and State of California, have invented certain new and useful Improvements in Cooking Utensils, of which the following is a specification, reference being had to the accompanying drawings.

This invention relates to cooking utensils, and particularly to a frying frame for use in connection with a vessel adapted to contain grease or oil.

An object of this invention is the provision of a frying frame in which doughnuts, oysters, or other articles of food to be fried are placed, means being provided to support the frame while the same is immersed in the grease, or while the frame is elevated above the grease after the food has been fried to allow the superfluous grease to drip therefrom.

A further object of this invention is the provision of a frying frame which includes a sectional spherical basket, the basket being rotatably supported whereby the same may be easily turned to turn the articles of food supported therein, the sections of the basket being also readily opened to remove the food from or place the same in the basket.

With these and other objects in view, my invention consists in the novel construction, combination, and arrangement of parts, to be hereinafter more fully described, claimed, and illustrated in the accompanying drawing, in which—

Figure 1:
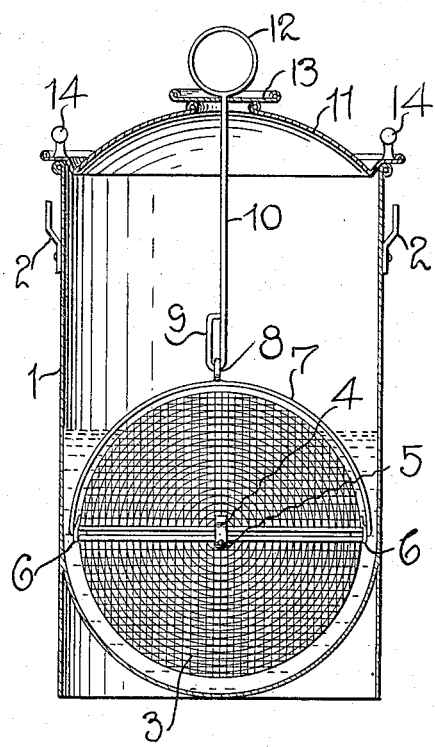
Figure 2:
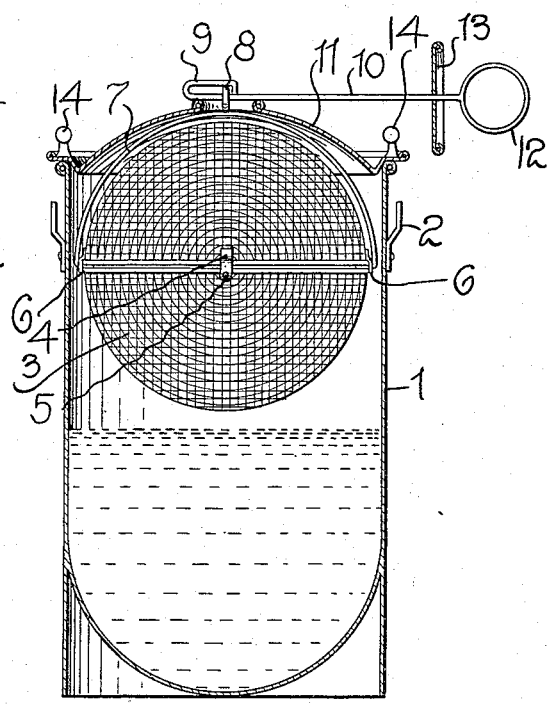
Figure 3:
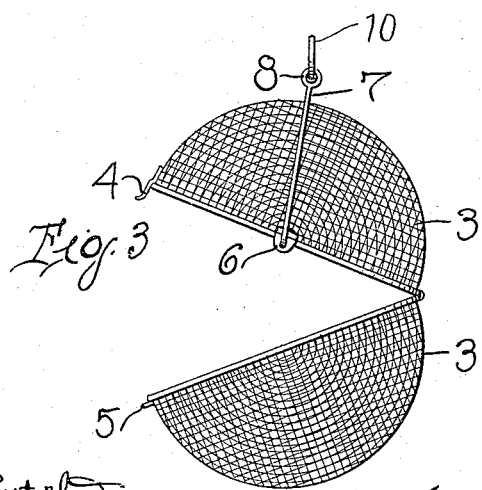

Figure 1 is a vertical sectional view of my device showing the basket supported in the lower end of the receptacle; Fig. 2 is a similar view showing the basket supported in the upper end of the receptacle; and Fig. 3 is an elevational view of the basket showing the same in open position.

Referring more particularly to the drawing, the numeral 1 designates a cylindrical vessel which is provided on opposite sides with handles 2, the vessel being adapted to be partly filled with grease, or other frying substance.

My improved frying frame comprises a spherical wire basket which is composed of two sections 3 hingedly connected together, one of the sections carrying a spring latch 4 and the other section a keeper 5, whereby the sections may be locked in closed position. One of the sections is provided on opposite sides and at its edge with apertured lugs 6 in which the opposite ends of a bowed bail 7 are mounted, the bail being provided with an eye 8 intermediate of its ends to receive the looped lower end 9 of a lifting rod 10. The rod 10 extends upwardly through an enlarged opening in the cover plate 11 which is adapted to close the upper open end of the vessel 1, and formed on the upper end of the rod 10 is a ring 12 by means of which the basket may be manipulated. Slidably mounted on the rod between the cover plate 11 and the ring 12 is a plate 13 which is adapted to close automatically the central opening in the cover through which the rod 10 extends, the plate 13 serving as a shield to prevent the free escape of steam from the vessel which would otherwise be liable to scald the hand of the operator.

In the practical use of my improved cooking utensil, the vessel 1 is partially filled with lard or the like in which the articles contained within the basket are to be fried, and after the vessel has been placed upon the stove, and the grease heated, the basket is immersed in the grease, the cover 11 engaging the upper edge of the vessel to close the same. It will be seen from the drawing that the rod 10 is of such length, that when the plate 13 is engaged against the cover to close the central opening therein, and the ring 12 rests upon the plate 13, the basket is spaced slightly from the bottom of the vessel so that the articles being fried therein cannot be burned from contact with the heated bottom. The weight of the basket serves to draw the cover tightly into engagement with the upper edge of the vessel, so that the heated grease is prevented from spattering out of the vessel and burning the hands of the person using the utensil. When the articles contained within the basket have been fried sufficiently, the rod 10 can be drawn upwardly by the engagement of a finger in the ring 12, to raise the basket above the level of the grease contained within the vessel, and when the rod has been moved upwardly sufficiently to dispose the loop 9 above the cover, the rod may be swung to a horizontal position and thence moved laterally to extend across the central opening in the cover as shown in Fig. 2 of the drawing, whereby the basket is held suspended above the grease, thus permitting the superfluous grease to drain from the basket and the food contained therein. After the grease has been thoroughly drained from the basket, the latter may be entirely removed from the vessel and the spring latch 4 released from its engagement with the keeper 5, whereby the articles of food may be easily removed from the basket. By reason of the pivotal connection of the bail 7 with the ears 6 of the basket, it will be seen that the basket may be readily turned when it is desired to turn the articles of food within the basket, so that the food will be quickly and thoroughly fried. Handles 14 which are preferably of non-heating material are secured to the cover 11, whereby the entire frame may be removed from the vessel without burning the fingers, the cover 11 serving to prevent steam from burning the hands of the operator.

Having thus fully described my invention, what I desire to claim and secure by Letters Patent is:—

In combination with a receptacle and a cover for the same, the cover being provided with an opening, of a rod adapted to be inserted through the opening, said rod being provided with an enlargement at one extremity, a container loosely engaged with one end of the rod, and a plate slidably mounted upon the rod serving as a shield and adapted to entirely close the opening in the cover, the enlargement of the rod coacting with the disk to limit the downward movement of the rod.

In testimony whereof I hereunto affix my signature in the presence of two witnesses.

FRANK EDMUND HILL FROST.

Witnesses:
J. N. TURNER,
HOWARD J. PEIRSOL.

Copies of this patent may be obtained for five cents each, by addressing the "Commissioner of Patents, Washington, D. C."